May 31, 1927.
S. A. COGSDILL
1,630,526
MACHINE TOOL
Filed March 30, 1925
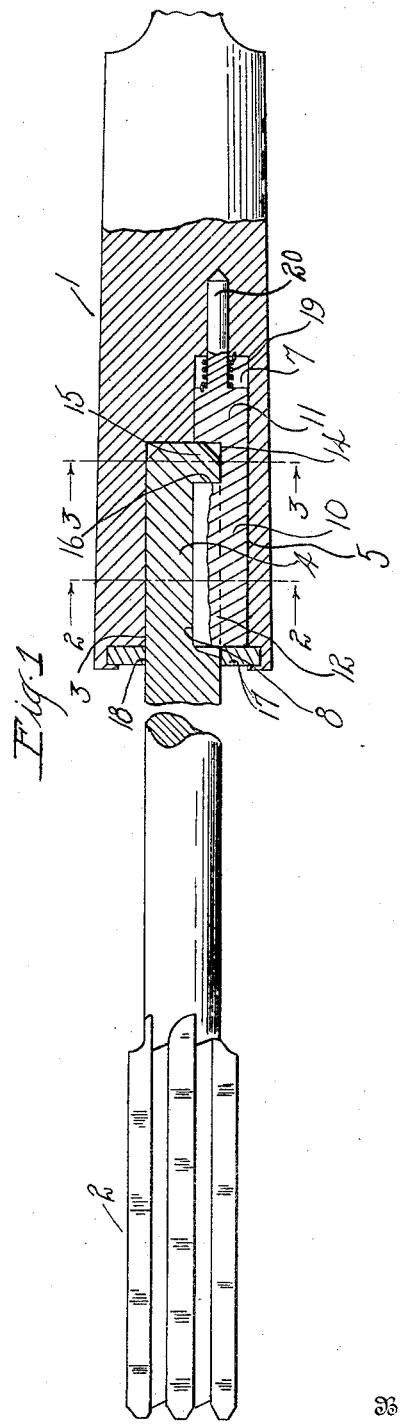
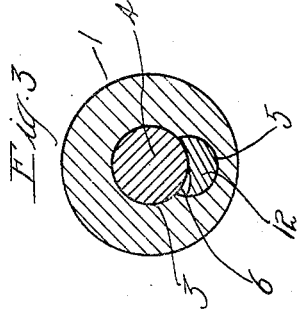
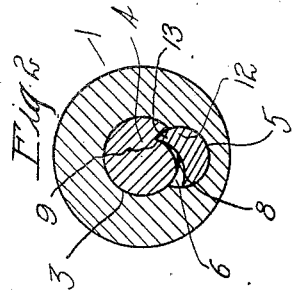
Inventor
Stuart A. Cogsdill
Attorneys Patented May 31, 1927.

1,630,526

UNITED STATES PATENT OFFICE.

STUART A. COGSDILL, OF DETROIT, MICHIGAN, ASSIGNOR TO COGSDILL MANUFACTURING COMPANY, OF DETROIT, MICHIGAN, A COPARTNERSHIP.

MACHINE TOOL.

Application filed March 30, 1925. Serial No. 19,521.

The invention relates to machine tools and refers more particularly to tools including cutters and holders therefor. One of the objects of the invention is the provision of an improved means for driving the cutter of a tool from its holder whereby an extended driving contact longitudinally of the cutter shank is secured. Another object is the provision of a driving means for the cutter which may be used in reclaimed or salvaged tools when the driving means of the old tools are worn out. With these as well as other objects in view the invention resides in the novel features of construction and combinations and arrangements of parts as more fully hereinafter set forth.

In the drawings:

Figure 1 is a sectional side elevation of a machine tool embodying my invention;

Figures 2 and 3 are cross sections on the lines 2—2 and 3—3 respectively of Figure 1.

1 is the holder of the machine tool and 2 the cutter, which as shown in the present instance is a reamer. The holder is provided with the axial recess 3 of circular cross section and extending from one end thereof for receiving the shank 4 of the cutter. The holder is also provided with the second recess 5 which has the portion 6 of half round cross section and extending longitudinally of and opening into the recess 3, and the portion 7 which has a circular cross section and is located beyond the inner end of the recess 3.

The cutter shank 4 has the longitudinally extending recess 8 in its side and terminating inside its end, this recess being preferably V-shaped and providing the under cut driving shoulder 9 extending longitudinally upon the cutter shank. 10 is a pawl engaging in the second recess 5 of the holder and provided with the cylindrical portion 11 journaled in the portion 7 of the recess and the half round portion 12 extending in the half round portion 6 of the recess. The edge portion 13 of the half round portion of the pawl is adapted to engage in the recess 8 of the cutter shank and contact with the shoulder 9 of the shank to drive the cutter from the holder there being an extended contact between the pawl and the shank longitudinally of the latter. A portion of the pawl between the edge portion 13 and the cylindrical portion 11 is cut away as at 14 to receive the solid portion 15 of the cutter shank between its end and the adjacent end of the recess 8 whereby the shoulder 16 formed upon the inner end of the edge portion 13 retains the cutter shank from accidental disengagement. The pawl is suitably retained in the holder as by means of the washer 17 located in the end of the holder and secured thereto in a suitable manner such as by peening over the end of the holder. This washer has the opening 18 therein which preferably registers with the recess 3, the arrangement being such that a portion of the washer closes the half round portion 6 of the second recess in the holder.

For normally rotating the pawl about its longitudinal axis and holding the same in position so that its edge portion 13 engages in the recess 8 of the cutter shank I have provided the coil spring 19, one end of which is secured to the inner end of the pawl and the other end of which is secured to the end of the second recess 5. This coil spring preferably surrounds the pawl shank 20 which extends axially from the cylindrical portion 11 of the pawl and is journaled in the holder beyond the end of the portion 7 of the second recess.

To assemble the cutter with the holder the recessed end 4 of the cutter shank is inserted into the recess 3 of the holder and forced over the edge portion 13 of the pawl 10, the end of the cutter shank being preferably beveled for this purpose. In forcing the end of the cutter shank over the edge portion of the pawl, the latter is compelled to rotate against the effort exerted by the spring 19 so that the half round portion 12 of the pawl will lie within the half round portion 6 of the second recess of the holder, the upper face of the half round portion being concave with the same radius of curvature as that of the recess 3. When the cutter shank has been forced inwardly into the recess 3 a sufficient distance it may be rotated to permit the edge portion 13 of the half round portion of the pawl to enter into the longitudinally extending recess 8 of the cutter shank under the influence of the coil spring 19. At this time the cutter is assembled with the holder so that the latter may drive the same in a counter clockwise direction as shown in Figure 2, with the lines of force extending in such a direction that a positive drive is provided for. Also at this time the cutter shank is held from accidental disengagement from the holder by means of the shoulder 16 upon the pawl engaging the solid portion of the cutter shank beyond its recess. However, the cutter may be disengaged from the holder by first rotating the cutter shank in a counter clockwise direction as shown in Figure 2 to thereby rotate the half round portion of the pawl back into the half round portion of the second recess of the holder and then longitudinally withdrawing the shank.

With the arrangement as above described it will be seen that the cutter is driven from the holder by a member having an extended contact with the cutter shank longitudinally thereof. It will also be seen that the arrangement is such that tools having worn out driving connections between the cutters and holders may be reclaimed or salvaged by substituting my improved driving means. Furthermore, it will be seen that I have provided improved driving means for the cutter which is simple and may be readily manufactured and assembled.

What I claim as my invention is:

1. In a machine tool, the combination with a cutter shank having a longitudinally extending recess in its side, of a holder having a recess extending longitudinally from one end thereof for receiving said shank, and having a second recess extending longitudinally of and communicating with the first mentioned recess, a pawl rotatable about its longitudinal axis arranged to lie within the second recess during the assembling of said shank with said holder and to extend into the recess in said shank and have an extended contact with said shank longitudinally thereof when said shank is assembled with said holder.

2. In a machine tool, the combination with a cutter shank having a longitudinally extending recess in its side, of a holder having a recess extending longitudinally from one end thereof for receiving said shank, and having a second recess extending longitudinally of and opening into the first mentioned recess, a member rotatable about its longitudinal axis, said member being adapted to lie within the second recess during the assembling of said shank with said holder and to extend into the recess in said shank and to have an extended contact with said shank longitudinally thereof when said shank is assembled with said holder, means for resiliently rotating said member to extend into the recess in said shank and means for retaining said member from accidental disengagement from the second recess.

3. In a machine tool, the combination with a cutter shank having a longitudinally extending recess in its side and terminating inside an end thereof, of a holder having a recess extending longitudinally from one end thereof for receiving the recessed end of said shank and having a second half round recess extending longitudinally of and opening into the first mentioned recess, and a half round pawl arranged to lie within the second recess during the assembling of said shank with said holder and having a portion arranged to extend into the recess in said shank and to have an extended contact with said shank longitudinally thereof when said shank is assembled with said holder.

4. In a machine tool, the combination with a cutter shank having a longitudinally extending recess in its side, of a holder having a recess extending longitudinally from one end thereof for receiving said shank and having a second half round recess extending longitudinally of and opening into the first mentioned recess and terminating in a circular recess beyond the inner end of the first mentioned recess, a pawl engaging in the second recess and having a portion journaled in the circular recess, said pawl having a half round portion arranged to lie within the second recess during the assembling of said shank with said holder and to extend into the recess in said shank and to have an extended contact with said shank longitudinally thereof when said shank is assembled with said holder, and resilient means for normally rotating said pawl to extend into the recess in said shank.

5. In a machine tool, the combination with a cutter shank having a longitudinally extending substantially V-shaped recess in its side forming an undercut driving shoulder upon the cutter shank, of a holder having a recess extending longitudinally from one end thereof for receiving said shank, and having a second recess extending longitudinally of and opening into the first-mentioned recess, a pawl having a half round portion arranged to lie within the second recess during the assembling of said shank with said shoulder, one edge of said half round portion adapted to engage the undercut shoulder upon the cutter shank for driving the cutter from the holder, and means for retaining the pawl from accidental disengagement from the second recess.

In testimony whereof I affix my signature.

STUART A. COGSDILL.